United States Patent
Kahlon et al.

(10) Patent No.: US 7,848,953 B2
(45) Date of Patent: Dec. 7, 2010

(54) ORDER FULFILLMENT LOGIC FOR A FIELD SERVICE SYSTEM

(75) Inventors: Param Kahlon, Mountain View, CA (US); Tae Jung Kim, Belmont, CA (US); Ajay Awatramani, San Francisco, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1230 days.

(21) Appl. No.: 10/936,094

(22) Filed: Sep. 7, 2004

(65) Prior Publication Data

US 2008/0015943 A1  Jan. 17, 2008

Related U.S. Application Data

(60) Provisional application No. 60/552,254, filed on Mar. 10, 2004.

(51) Int. Cl.
*G06Q 20/00* (2006.01)
*G06Q 10/00* (2006.01)

(52) U.S. Cl. .......................................... 705/22; 705/28
(58) Field of Classification Search ...................... None
See application file for complete search history.

(56) References Cited

U.S. PATENT DOCUMENTS

| | | | |
|---|---|---|---|
| 6,963,847 B1 * | 11/2005 | Kennedy et al. | 705/8 |
| 7,249,044 B2 * | 7/2007 | Kumar et al. | 705/8 |
| 2002/0042755 A1 * | 4/2002 | Kumar et al. | 705/26 |
| 2002/0042756 A1 * | 4/2002 | Kumar et al. | 705/26 |
| 2003/0093388 A1 * | 5/2003 | Albright | 705/400 |
| 2003/0171962 A1 * | 9/2003 | Hirth et al. | 705/7 |
| 2003/0172007 A1 * | 9/2003 | Helmolt et al. | 705/28 |
| 2004/0015408 A1 * | 1/2004 | Rauen et al. | 705/26 |

* cited by examiner

*Primary Examiner*—F. Ryan Zeender
*Assistant Examiner*—Mussa Shaawat
(74) *Attorney, Agent, or Firm*—Campbell Stephenson LLP (57) ABSTRACT

In one embodiment, an order pertaining to one or more items available at multiple inventory locations associated with an organization is received, and a preference order fulfillment list is created for the multiple inventory locations based on one or more criteria configurable by the organization.

25 Claims, 6 Drawing Sheets

| Order Priority Weightage | Dallas Central Warehouse | San Francisco Distribution | Chicago Distribution | Los Angeles Distribution | Oakland Field Office | San Jose Field Office | Sacramento Field Office | Schaumberg Field Office | Orange County Field Office | San Diego Field Office | Santa Barbara Field Office |
|---|---|---|---|---|---|---|---|---|---|---|---|
| Low | 4 | 3 | 3 | 3 | 1 | 1 | 1 | 1 | 1 | 1 | 1 |
| Medium | 4 | 3 | 3 | 3 | 2 | 2 | 2 | 2 | 2 | 2 | 2 |
| High | 4 | 3 | 3 | 3 | 3 | 3 | 3 | 3 | 3 | 3 | 3 |

| Loc ID | Location | Low (y) | Distance (x) | F(x,y) = x- 500y |
|---|---|---|---|---|
| 2-1 | San Francisco Distribution | 3 | 37 | -1463 |
| 2-3 | Los Angeles Distribution | 3 | 364 | -1136 |
| 3-2 | San Jose Field Office | 1 | 17 | -483 |
| 3-1 | Oakland Field Office | 1 | 26 | -474 |
| 3-3 | Sacramento Field Office | 1 | 105 | -395 |
| 3-7 | Santa Barbara Field Office | 1 | 306 | -194 |
| 1-1 | Dallas Central Warehouse | 4 | 1815 | -185 |
| 3-5 | Orange County Field Office | 1 | 412 | -88 |
| 3-6 | San Diego Field Office | 1 | 491 | -9 |
| 2-2 | Chicago Distribution | 3 | 2172 | 672 |
| 3-4 | Schaumberg Field Office | 1 | 2168 | 1668 |

| Loc ID | Location | High (y) | Distance (x) | F(x,y) = x- 500y |
|---|---|---|---|---|
| 3-2 | San Jose Field Office | 3 | 17 | -1483 |
| 3-1 | Oakland Field Office | 3 | 26 | -1474 |
| 2-1 | San Francisco Distribution | 3 | 37 | -1463 |
| 3-3 | Sacramento Field Office | 3 | 105 | -1395 |
| 3-7 | Santa Barbara Field Office | 3 | 306 | -1194 |
| 2-3 | Los Angeles Distribution | 3 | 364 | -1136 |
| 3-5 | Orange County Field Office | 3 | 412 | -1088 |
| 3-6 | San Diego Field Office | 3 | 491 | -1009 |
| 1-1 | Dallas Central Warehouse | 4 | 1815 | -185 |
| 3-4 | Schaumberg Field Office | 3 | 2168 | 668 |
| 2-2 | Chicago Distribution | 3 | 2172 | 672 |

ORDER FULFILLMENT LOGIC FOR A FIELD SERVICE SYSTEM

RELATED APPLICATIONS

The present application claims priority to U.S. Provisional Application Ser. No. 60/552,254, filed Mar. 10, 2004, which is incorporated herein in its entirety.

FIELD OF THE INVENTION

This invention relates generally to field service automation, and more particularly to order fulfillment within a field service system.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2004, Siebel Systems, Inc., All Rights Reserved.

BACKGROUND OF THE INVENTION

The Internet is transforming corporate architectures. Businesses are now recreating themselves to become more efficient and to find new business opportunities. Various technologies have emerged to assist in the automation of companies' operations. One example of such technologies is Customer Relationship Management (CRM) designed to help companies to improve their interaction with customers. Effective CRM typically allows organizations to manage and coordinate customer interactions across multiple channels, including, for example, sales, marketing and service channels. One exemplary aspect of service CRM is field service management.

A typical field service application operates by receiving a report of a customer problem, identifying which parts and labor are needed to resolve the problem, and ordering the required parts from an inventory location. Depending on a contract between the customer and the service organization, the order may need to be fulfilled in a short or long period of time. For example, the customer's contract may require the service organization to replace a malfunctioning router in any customer's location within two hours. Typically, a service organization has a large number of inventory locations that are geographically dispersed to provide service to customers at different geographical regions. In addition, a service organization does not stock every part at each inventory location to decrease the inventory holding costs. Rather, a service organization tends to stock parts depending upon the criticality factor. In particular, a service organization usually stocks critical parts closer to the customers in local field offices (also known as expedite locations) and the less critical parts at the central distribution location that services a larger customer base. Current field service applications typically define static lists of inventory locations for each geographical region serviced by the organization and then use the same static list for all orders associated with a unique geographical region, without taking into consideration the priority level of the order, inventory replenishment costs, or any other factors specific to the contract and the inventory locations from the static list.

SUMMARY OF THE INVENTION

According to one aspect of the present invention, an order pertaining to one or more items available at multiple inventory locations associated with an organization is received, and a preference order fulfillment list is created for the multiple inventory locations based on one or more criteria configurable by the organization.

The present invention describes systems, clients, servers, methods, and machine-readable media of varying scope. In addition to the aspects of the present invention described in this summary, further aspects of the invention will become apparent by reference to the drawings and by reading the detailed description that follows.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 1:
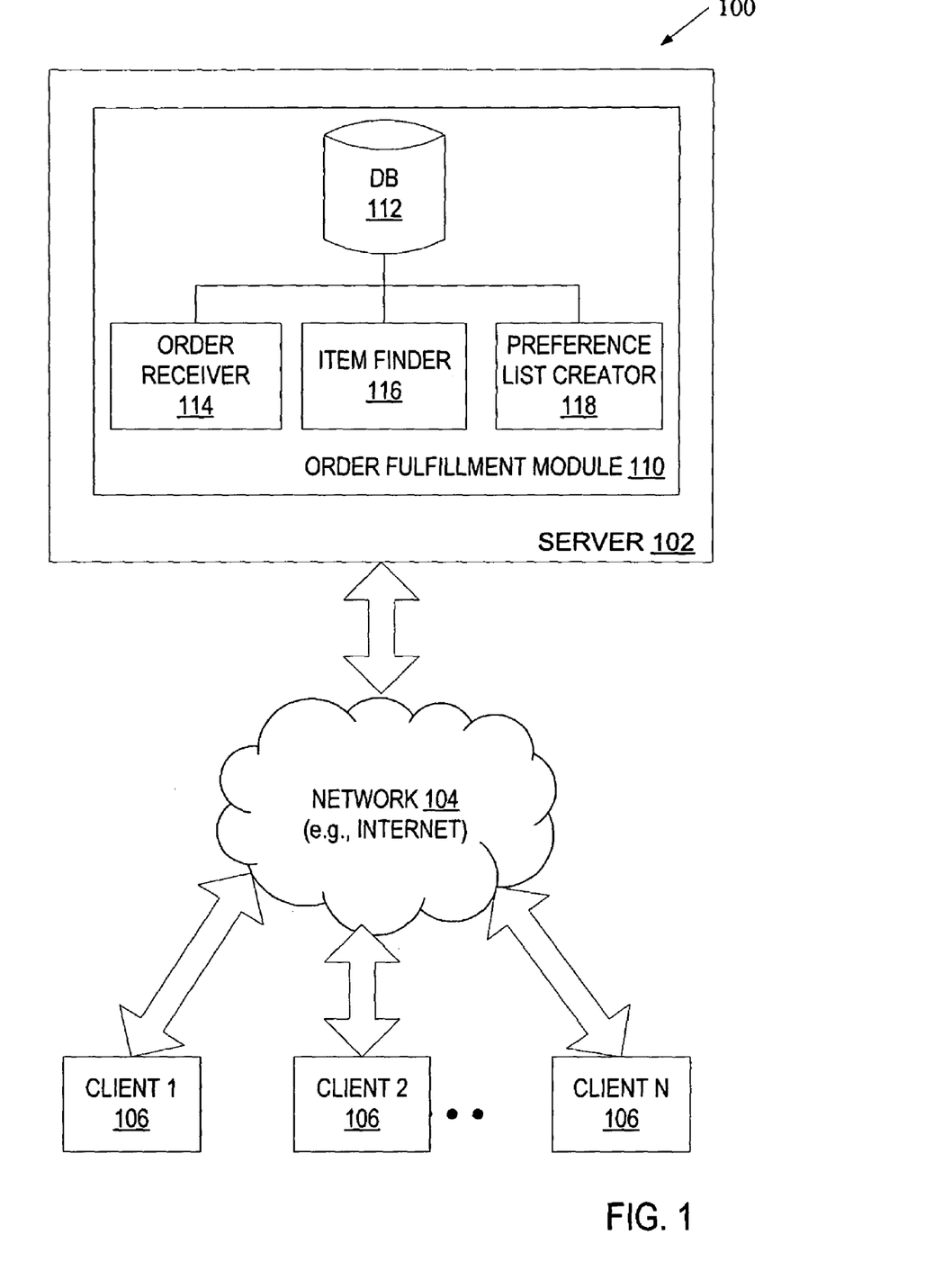
FIG. 1 is a block diagram of one embodiment of an order fulfillment system.

FIG. 1 is a block diagram of one embodiment of an order fulfillment system 100. The order fulfillment system 100 includes a server 102 and a number of client devices 106 (clients 1 through N) coupled to the server 102 via a communications network 104. The communications network 104 may be, for example, a wide area network (e.g., the Internet), a local area network (LAN), a wireless network (e.g., a cellular network), the Plain Old Telephone Service (POTS) network, etc.

Each client 106 represents a device that allows a user to communicate with the server 102. The user is a representative (e.g., an employee) of an organization such as a service organization that provides service (e.g., field service) to customers, a sales organization that sells products to customers, etc. The server 102 includes an order fulfillment module 110 that dynamically creates, for each order submitted by the users of clients 106, a preference list identifying optimal inventory locations for fulfilling this order. A submitted order may be, for example, a parts order associated with a field service request, a sales order associated with a purchase request, etc. The preference order fulfillment list is created based on criteria configurable by the organization. These criteria may include, for example, the distance between the inventory location and shipping location, a priority level (e.g., low priority, high priority, etc.) of the order, priority level weights of the inventory location (e.g., weight for fulfilling orders of a specific priority level from this inventory location), the shipping preference of the inventory location, supplier status, and/or other factors that need to be considered when selecting an inventory location for fulfilling the order. In one embodiment, an organization may define criteria that allow orders to be consumed in such a way that both priority level commitments associated with the orders (e.g., priority levels of the orders) and inventory fulfillment rules of the organization (e.g., low inventory holding costs and low replenishment costs) are satisfied.

In one embodiment, the order fulfillment module 110 includes an order receiver 114, an item finder 116, a preference list creator 118, and a database 112. The order receiver is responsible for receiving orders from clients 106 and identifying parameters associated with the orders (e.g., priority level, shipping location, items to be ordered, etc.). The item finder 116 is responsible for finding inventory locations having the requested items using data stored in the database 112. The preference list creator 118 is responsible for creating preference lists to fulfill the orders. Each preference list is created based on the criteria defined by the organization. In one embodiment, a preference list is created by calculating a criteria value (e.g., using a formula that combines all or some of the criteria) for each inventory location having the requested item(s), and sorting the inventory locations having the requested item(s) by the calculated criteria value.

Figure 2:
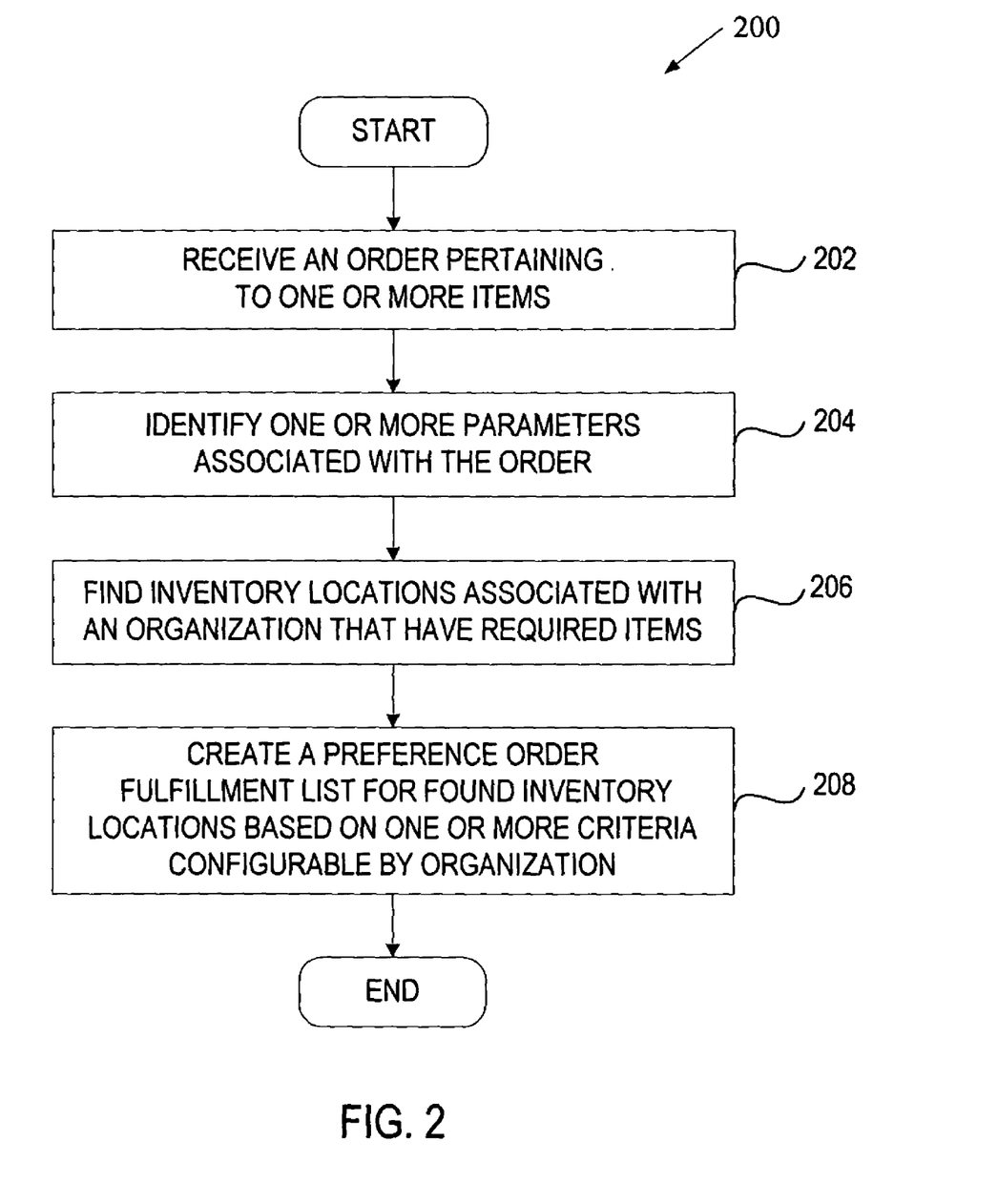
FIG. 2 is a flow diagram of one embodiment of a process for fulfilling orders.

FIG. 2 is a flow diagram of one embodiment of a process 200 for fulfilling an order. The process may be performed by processing logic that may comprise hardware (e.g., circuitry, dedicated logic, etc.), software (such as run on a general purpose computer system or a dedicated machine), or a combination of both. Processing logic may reside on the server 102 or any other device coupled to the server 102.

Referring to FIG. 2, process 200 begins with processing logic receiving an order pertaining to one or more items (e.g., parts required for field service or products ordered by a customer) (processing block 202) and identifying one or more parameters associated with the order (e.g., the priority level of the order, shipping location, items to be ordered, etc.) (processing block 204).

Next, processing logic finds inventory locations associated with an organization (e.g., inventory locations of the organization or its partners) that have the required items (processing block 206).

Further, processing logic creates a preference order fulfillment list for the found inventory locations based on one or more criteria configurable by the service organization (processing block 208). The one or more criteria may include a single parameter (e.g., a distance between the shipping location associated with the order and the inventory location) or a combination of several parameters (e.g., a distance between the shipping location associated with the order and the inventory location, the priority level associated with the order, priority weight associated with the inventory location, shipping preference associated with the inventory location, supplier status, etc.). In one embodiment, in which a single criterion is used, the preference order fulfillment list is created by sorting the found inventory locations by this criterion. In another embodiment, the preference order fulfillment list is created by calculating a criteria value (e.g., using a predefined formula that combines multiple criteria) and sorting the found inventory locations by the calculated criteria value.

As discussed above, the process 200 may be used by a service organization to fulfill field service orders. Exemplary criteria defined by the service organization for use in the order fulfillment process may include a priority level associated with a field service order, priority weights of inventory locations associated with the service organization, and a distance between each inventory location and location associated with the field service order. It should be noted, however, that the above criteria are provided for illustrative purposes only, and various other criteria may be used with the embodiments of the present invention without loss of generality.

Figure 3:
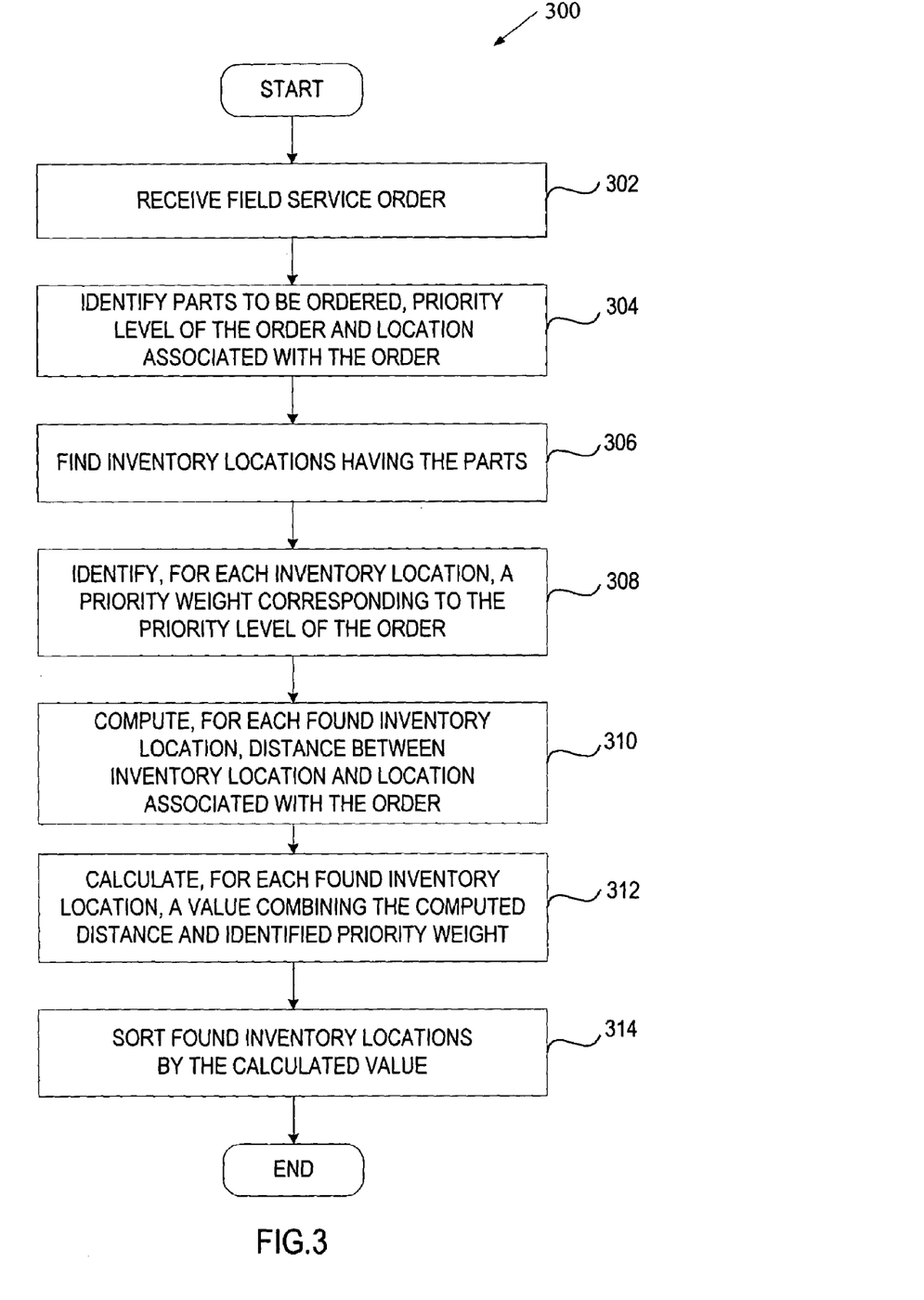
FIG. 3 is a flow diagram of an exemplary process for fulfilling field service orders in a field service management system, according to one embodiment of the present invention.

FIG. 3 is a flow diagram of an exemplary process 300 for fulfilling a field service order in a field service management system, according to one embodiment of the present invention. The process may be performed by processing logic that may comprise hardware (e.g., circuitry, dedicated logic, etc.), software (such as run on a general purpose computer system or a dedicated machine), or a combination of both. Processing logic may reside on the server 102 or any other device coupled to the server 102.

Referring to FIG. 3, process 300 begins with processing logic receiving a field service order pertaining to one or more parts required for field service (processing block 302) and identifying parameters associated with the order such as the priority level of the order, location associated with the order, and parts to be ordered (processing block 304).

Next, processing logic finds inventory locations associated with a service organization that have the required parts (processing block 306) and identifies, for each found inventory location, a priority weight corresponding to the priority level of the order (processing block 308). In one embodiment, the priority weight is identified using data stored in a database such as the database 112. That is, the database 112 may store, for each inventory location, a set of priority weights corresponding to predefined order priority levels. In one embodiment, priority weights are maintained for individual parts. Alternatively, the same priority weights are maintained for all the parts in the inventory location.

Further, processing logic computes, for each found inventory location, a distance between the relevant inventory location and the location associated with the order (processing block 310) and calculates, for each found inventory location, a value that combines the computed distance and the priority weight identified at processing block 308 (processing block 312).

Afterwards, at processing block 314, processing logic sorts the found inventory locations by the value calculated at processing block 312. As a result, a preference order fulfillment list is dynamically created for the order, with the most optimal inventory location at the top.

Figure 4:
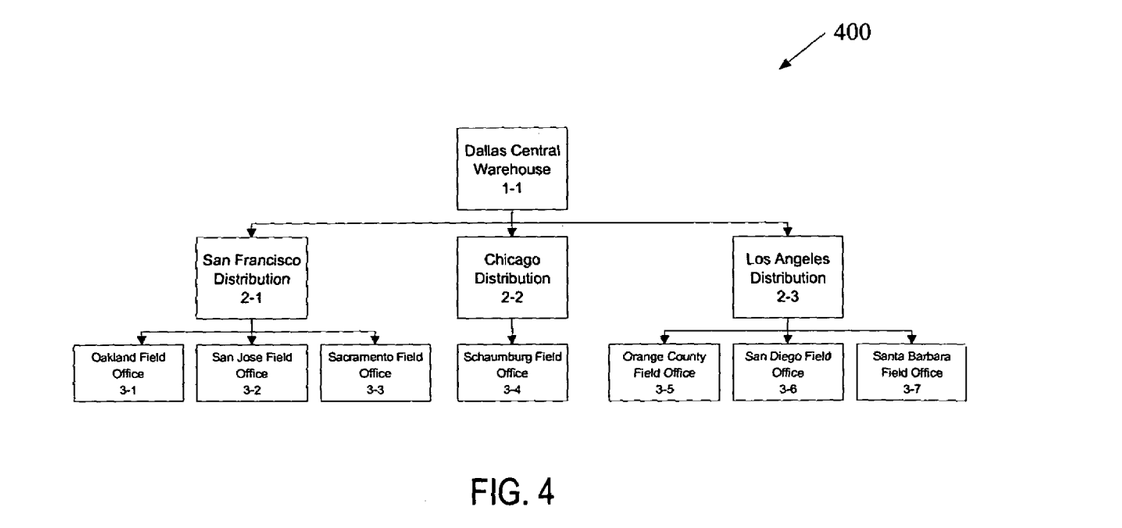
FIG. 4 illustrates an exemplary chain of service inventory locations having parts required by an order.
Figure 5:
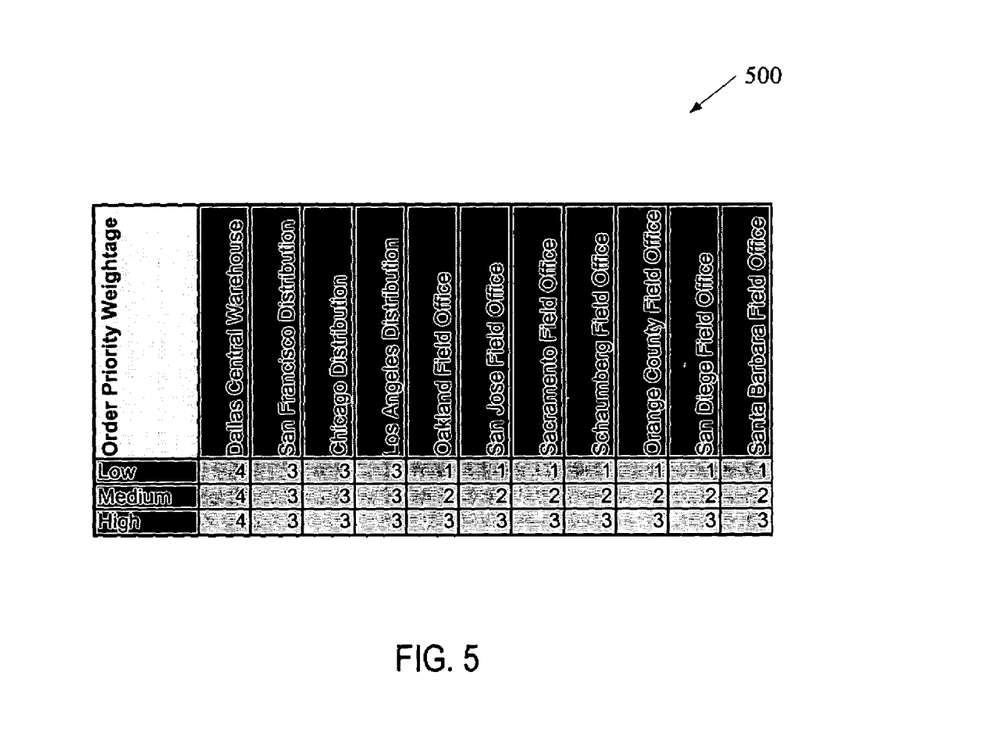
FIG. 5 illustrates an exemplary table storing, for each inventory location, a set of priority weights.

An example of an order for parts to be shipped to Fremont, Calif. will now be described. FIG. 4 illustrates an exemplary chain 400 of service inventory locations having the parts required by the order. FIG. 5 illustrates an exemplary table 500 storing, for each inventory location from FIG. 4, a set of priority weights (referred to as order priority weightage). Each priority weight in the set corresponds to a particular priority level (i.e., a low priority level, a medium priority level, and a high priority level).

When creating a preference list for the order, a distance between each inventory location and Fremont is calculated. In one embodiment, the distance is a Euclidean distance calculated using latitude-longitude data available from the zip code administration data.

Next, a value combining relevant calculated distance and priority weight is computed for each inventory location. For example, this value may be computed using the following expression:

$$F(x,y)=x-500y,$$

wherein x is the distance calculated for a relevant inventory location, and y is the priority weight corresponding to the priority level of the order for the relevant inventory location.

Figure 6A:
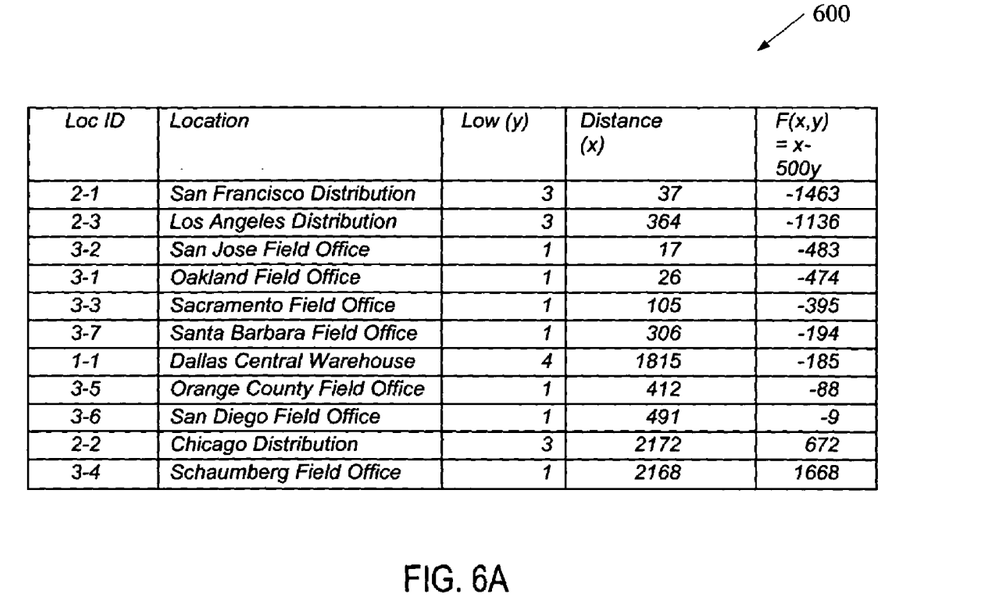
FIG. 6A illustrates an exemplary preference list to fulfill an order with a low priority level.
Figure 6B:
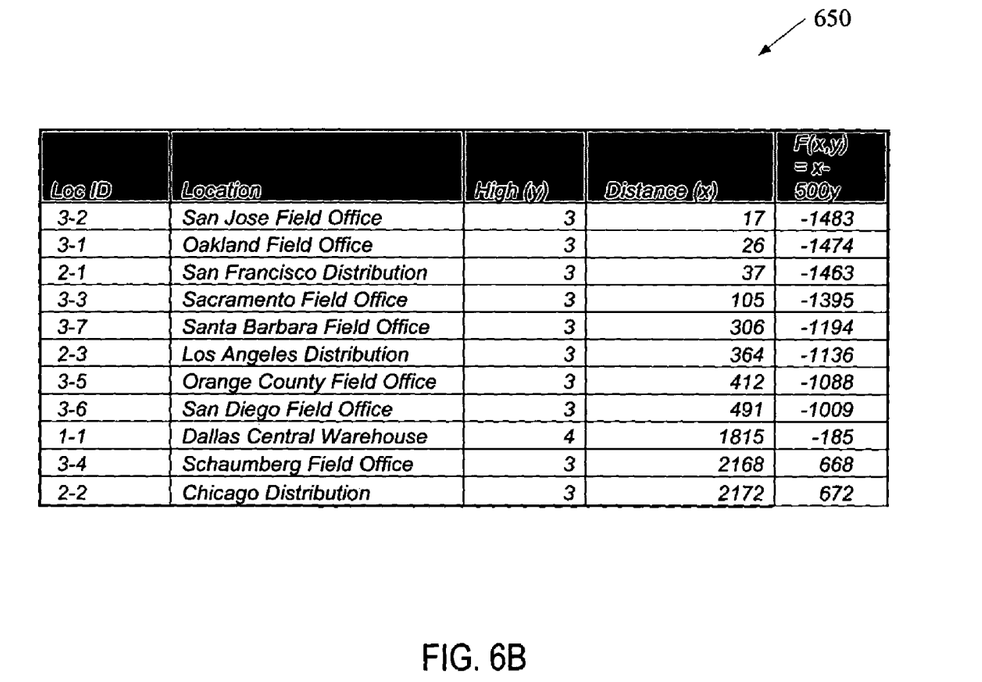
FIG. 6B illustrates an exemplary preference list to fulfill an order with a high priority level.

The computed values are then used to sort the found inventory locations into a preference list. FIG. 6A illustrates an exemplary preference list 600 to fulfill the order with a low priority level. FIG. 6B illustrates an exemplary preference list 650 to fulfill the order with a high priority level. Accordingly, the San Francisco Distribution location or Los Angeles Distribution location is the optimal inventory location for a low priority order, and the San Jose or Oakland field office is the optimal inventory location for a high priority order.

Figure 7:
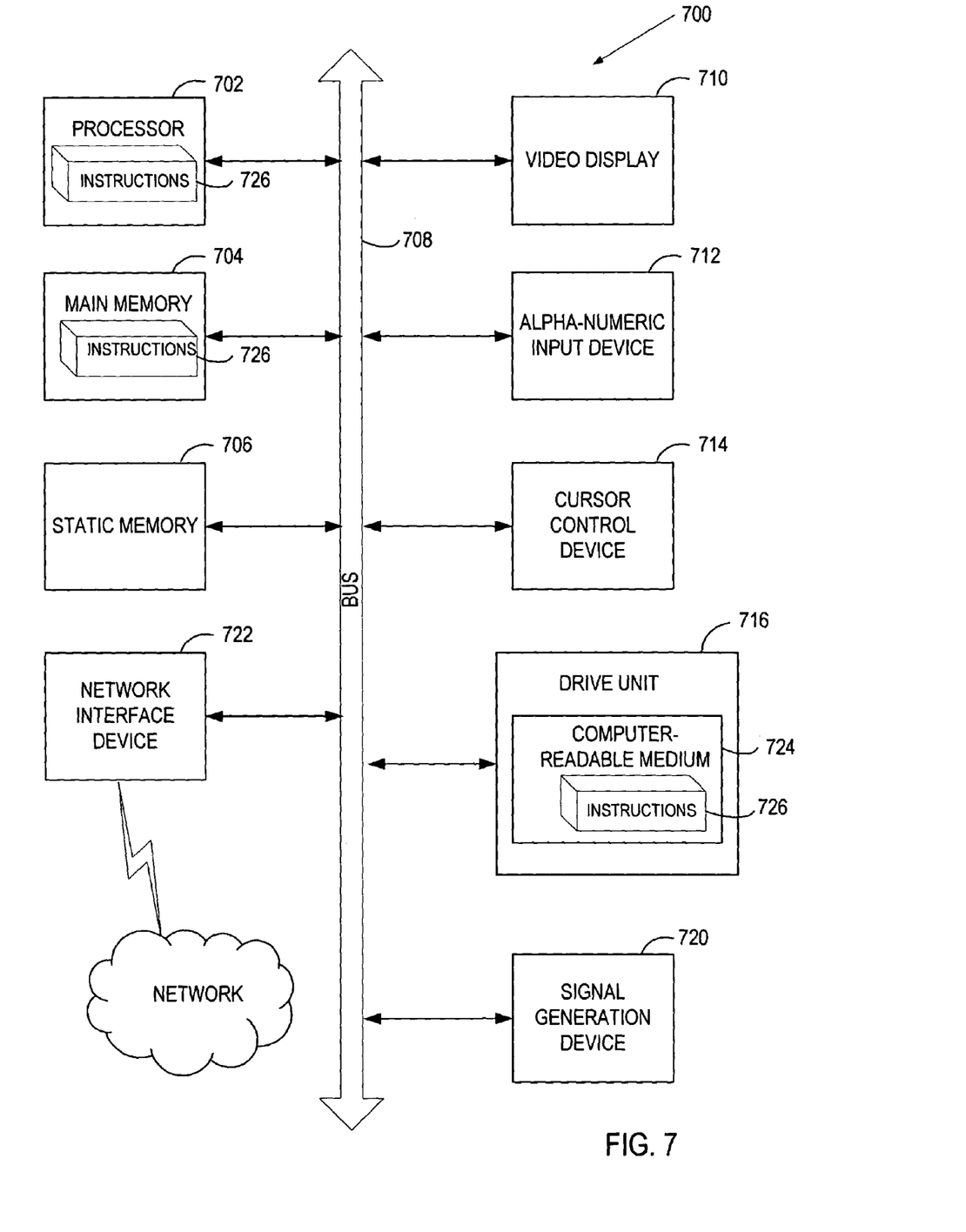
FIG. 7 is a block diagram of an exemplary computer system.

FIG. 7 is a block diagram of an exemplary computer system 700 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 700 includes a processor 702, a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alpha-numeric input device 712 (e.g., a keyboard), a cursor control device 714 (e.g., a mouse), a disk drive unit 716, a signal generation device 720 (e.g., a speaker) and a network interface device 722.

The disk drive unit 716 includes a computer-readable medium 724 on which is stored a set of instructions (i.e., software) 726 embodying any one, or all, of the methodologies described above. The software 726 is also shown to reside, completely or at least partially, within the main memory 704 and/or within the processor 702. The software 726 may further be transmitted or received via the network interface device 722. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A computer-implemented method comprising:
   a computer system receiving an order, wherein
      the order is comprised of a priority level, a shipping location, and an item to be ordered, wherein the item to be ordered is available at a plurality of inventory locations of a supplier;
   the computer system calculating a customer-based value, wherein
      the customer-based value depends on the priority level;
   the computer system selecting an inventory location of the plurality of inventory locations from which to ship the item;
   the computer system calculating a supplier-based value, wherein
      the supplier-based value depends on the selected inventory location; and the computer system calculating an order priority value, wherein
the calculating the order priority value comprises applying a function to the customer-based value and the supplier-based value,
the calculating generates a sortable range of values, and
the order priority value is an extremum of the sortable range of values.

2. The computer-implemented method of claim 1, wherein the calculating the supplier-based value is based on inventory fulfillment rules comprising
a rule for maintaining inventory holding costs beneath a first cost threshold, and
a rule for maintaining replenishment costs beneath a second cost threshold.

3. The computer-implemented method of claim 1, wherein the calculating the supplier-based value further comprises
the computer system identifying a set of priority levels;
the computer system identifying a set of priority weights for the selected inventory location;
each priority level of the set of priority levels corresponds to a respective priority weight of the set of priority weights;
determining a priority weight of the set of priority weights corresponding to the priority level; and
the supplier-based value further depends on the priority weight.

4. The computer-implemented method of claim 1, wherein the selecting the inventory location further comprises
calculating shipping distances from the plurality of inventory locations to the shipping location.

5. The computer-implemented method of claim 1, wherein the calculating the customer-based value further comprises
identifying an order fulfillment obligation stored within a memory coupled to the computer system, wherein
the order fulfillment obligation is owed by the supplier to a customer sending the order, and
the contract order fulfillment obligation existed in the memory before the order was received; and
the customer-based value further depends on the order fulfillment obligation.

6. The computer-implemented method of claim 3 further comprising:
maintaining, in a database, the set of priority weights for each of the plurality of inventory locations, each priority weight in the set of priority weights corresponding to a respective priority level of the set of priority levels.

7. The computer-implemented method of claim 1, wherein the function is calculated as (the supplier-based value)−(the customer-based value*a scaling factory).

8. The computer-implemented method of claim 4 wherein each of the shipping distances is a Euclidean distance calculated using latitude-longitude data.

9. The computer-implemented method of claim 1 further comprising
the computer-system selecting a second inventory location of the plurality of inventory locations from which to ship the item;
the computer system calculating a second supplier-based value, wherein
the second supplier-based value depends on the selected second inventory location; and
the computer system calculating an second order priority value, wherein
the second order priority value depends on the customer-based value and the second supplier-based value.

10. The computer-implemented method of claim 9, further comprising
sorting the order priority value and the second order priority value; and
generating a preference order fulfillment list based on the sorting.

11. An apparatus comprising:
an order receiver circuit, wherein the order receiver circuit is configured to receive an order,
wherein the order is comprised of
a priority level,
a shipping location, and
an item to be ordered, wherein the item to be ordered is available at a plurality of inventory locations of a supplier;
a customer-based value calculation circuit for calculating a customer-based value, wherein the customer-based value depends on the priority level;
an inventory location selection circuit for selecting an inventory locations, wherein an inventory location is selected from the plurality of inventory locations from which to ship the item;
a supplier-based value calculation circuit for calculating a supplier-based value, wherein the supplier-based value depends on the selected inventory location; and
an order priority value calculation circuit for calculating an order priority value, wherein
the calculating the order priority value comprises applying a function to the customer-based value and the supplier-based value,
the calculating generates a sortable range of values, and
the order priority value is an extremum of the sortable range of values.

12. The apparatus of claim 11, wherein the supplier-based value calculation circuit is further configured to calculate the supplier-based value based on
inventory fulfillment rules comprising
maintaining inventory holding costs beneath a first cost threshold, and
maintaining replenishment costs beneath a second cost threshold; and
the supplier-based value further depends on the inventory fulfillment rules.

13. The apparatus of claim 11, wherein the supplier-based value calculation circuit is further configured to calculate the supplier-based value based on
identifying a set of priority levels;
identifying a set of priority weights for the selected inventory location:
wherein each priority level of the set of priority levels corresponds to a respective priority weight of the set of priority weights: determining a priority weight of the set of priority weights corresponding to the priority level:
and wherein the supplier-based value further depends on the priority weight.

14. The apparatus of claim 11, wherein the supplier-based value calculation circuit is further configured to calculate the supplier-based value based on calculating shipping distances from the plurality of inventory locations to the shipping location; and the supplier-based value further depends on the shipping distances.

15. The apparatus of claim 11, wherein the customer-based value calculation circuit is further configured to calculate the customer-based value based on
identifying an order fulfillment obligation stored within a memory coupled to the computer system, wherein the order fulfillment obligation is owed by the supplier to a customer sending the order, and
the order fulfillment obligation existed in the memory before the order was received; and
the customer-based value further depends on the order fulfillment obligation.

16. The apparatus of claim 15, wherein the order priority value calculation circuit is further configured to calculate the function is calculated as (the supplier-based value)–(the customer-based value*a scaling factor).

17. The apparatus of claim 16 wherein
the inventory location circuit further selects a second inventory location of the plurality of inventory locations from which to ship the item: the supplier-based calculation circuit further calculates a second supplier-based value, wherein
the second supplier-based value depends on the selected second inventory location; and
the order priority value calculation circuit further calculates a second order priority value, wherein
the second order priority value depends on the customer-based value and the second supplier-based value; a sorting circuit for sorting the order priority value and the second order priority value; and
a generating circuit for generating a preference order fulfillment list based on the sorting.

18. A non-transitory machine-readable medium having executable instructions to cause a machine to perform a method comprising:
receiving an order, wherein
the order is comprised of a priority level, a shipping location, and an item to be ordered, wherein
the item to be ordered is available at a plurality of inventory locations of a supplier;
computing a customer-based value, wherein
the customer-based value depends on the priority level;
selecting an inventory location of the plurality of inventory locations from which to ship the item;
computing a supplier-based value, wherein
the supplier-based value depends on the selected inventory location; and
computing an order priority value, wherein
the computing the order priority value comprises applying a function to the customer-based value and the supplier-based value,
the calculating generates a sortable range of values, and
the order priority value is an extremum of the sortable range of values.

19. The non-transitory machine-readable medium of claim 18 wherein the computing the supplier-based value further comprises inventory fulfillment rules comprising
maintaining inventory holding costs beneath a first cost threshold, and
maintaining replenishment costs beneath a second cost threshold, identifying a set of priority levels,
identifying a set of priority weights for the plurality of inventory location,
each priority level element of the set of priority levels corresponds to a priority weight element of the set of priority weights,
determining a priority weight of the set of priority weights corresponding to the priority level,
the selecting the inventory location further comprises
calculating shipping distances from the shipping location to the plurality of inventory locations, and
the supplier-based value further depends on
the inventory fulfillment rules,
the priority weight, and
the shipping distances; and
the computing the customer-based value further comprises
identifying an order fulfillment obligation stored within a memory coupled to the computer system, wherein
the order fulfillment obligation is owed by the supplier to a customer sending the order, and
the order fulfillment obligation existed in the memory before the order was received, and
the customer-based value further depends on the order fulfillment obligation.

20. The non-transitory machine-readable medium of claim 18 further comprising selecting a second inventory location of the plurality of inventory locations from which to ship the item;
computing a second supplier-based value, wherein
the second supplier-based value depends on the selected second inventory location: and computing an second order priority value, wherein
the second order priority value depends on the customer-based value and the second supplier-based value; sorting the order priority value and the second order priority value: and generating a preference order fulfillment list based on the sorting.

21. A system comprising:
a memory; and
at least one processor coupled to the memory, the processor executing a set of instructions which cause the processor to
receive an order, wherein the order is comprised of
a priority level,
a shipping location, and
an item to be ordered, wherein the item to be ordered is available at a plurality of inventory locations of a supplier,
calculate a customer-based value, wherein
the customer-based value depends on the priority level,
select an inventory location of the plurality of inventory locations from which to ship the item,
calculate a supplier-based value, wherein
the supplier-based value depends on the selected inventory location, and
calculate an order priority value, wherein
the calculating the order priority value comprises applying a function to the customer-based value and the supplier-based value,
the calculating generates a sortable range of values, and
the order priority value is an extremum of the sortable range of values.

22. The system of claim 21 wherein the calculating of the supplier-based value further comprises inventory fulfillment rules comprising
maintaining inventory holding costs beneath a first cost threshold, and
maintaining replenishment costs beneath a second cost threshold,
the computer system identifying a set of priority levels,
the computer system identifying a set of priority weights for the selected inventory location,
each priority level element of the set of priority levels corresponds to a priority weight element of the set of priority weights, determining a priority weight of the set of priority weights corresponding to the priority level, the selecting the inventory location further comprises
calculating shipping distances from the plurality of inventory locations to the shipping location, and the supplier-based value further depends on
the inventory fulfillment rules,
the priority weight, and
the shipping distance.

23. The system of claim 21 wherein
the calculation of the customer-based value further comprises
identifying an order fulfillment obligation stored within a memory coupled to the computer system, wherein
the order fulfillment obligation is owed by the supplier to a customer sending the order, and
the order fulfillment obligation existed in the memory before the order was received; and
the customer-based value further depends on the order fulfillment obligation.

24. The system of claim 21, wherein the function is calculates as $$\text{(the supplier-based value)} - \text{(the customer-based value} * \text{a scaling factor.)}$$

25. The system of claim 24, further comprising
selecting a second inventory location of the plurality of inventory locations from which to ship the item;
calculating a second supplier-based value; wherein
the second supplier-based value depends on the selected second inventory location; and
calculating an second order priority value, wherein
the second order priority value depends on the customer-based value and the second supplier-based value;
sorting the order priority value and the second order priority value; and
generating a preference order fulfillment list based on the sorting.

* * * * *

UNITED STATES PATENT AND TRADEMARK OFFICE
CERTIFICATE OF CORRECTION

PATENT NO.       : 7,848,953 B2
APPLICATION NO.  : 10/936094
DATED            : December 7, 2010
INVENTOR(S)      : Param Kahlon et al.

It is certified that error appears in the above-identified patent and that said Letters Patent is hereby corrected as shown below:

In column 7, line 38, in claim 5, after "the" delete "contract".

Signed and Sealed this
Ninth Day of August, 2011

David J. Kappos
*Director of the United States Patent and Trademark Office*